UNITED STATES PATENT OFFICE.

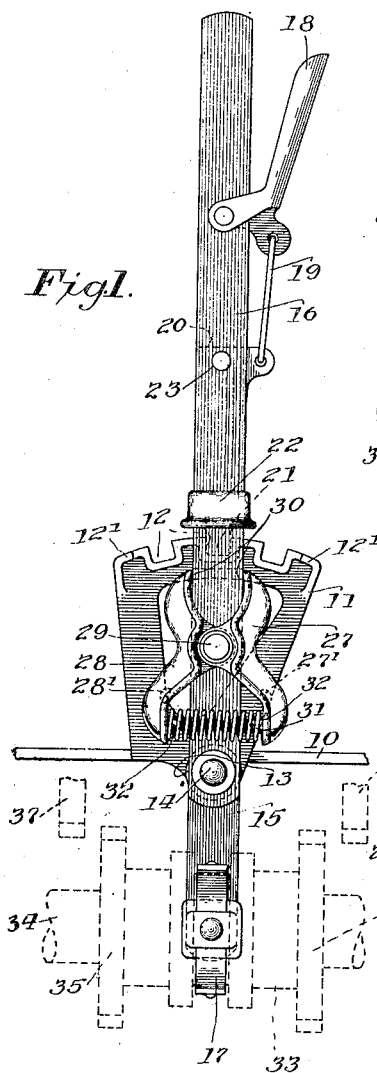
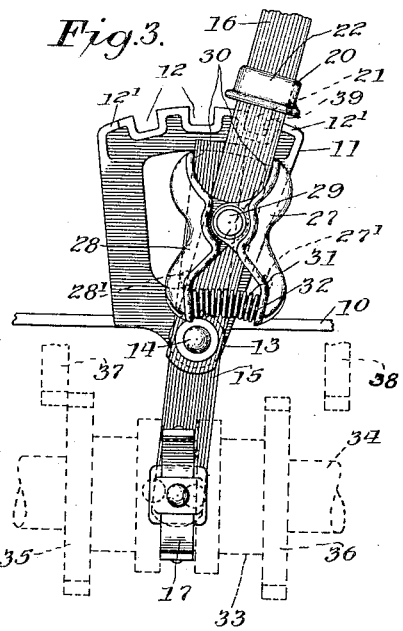
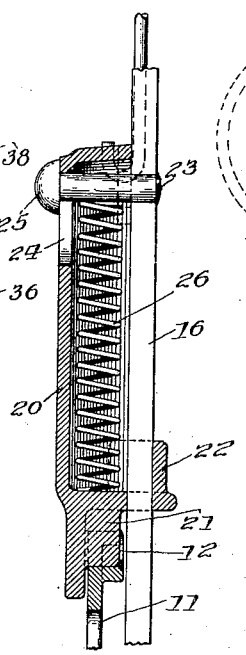
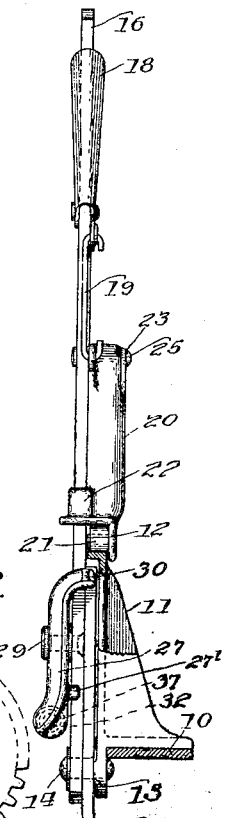
A. GRIEVES.
LEVER.
APPLICATION FILED AUG. 13, 1917.
1,427,684. Patented Aug. 29, 1922.
Inventor
Albert Grieves,

ALBERT GRIEVES, OF SPRINGFIELD, OHIO, ASSIGNOR, BY MESNE ASSIGNMENTS, TO INTERNATIONAL HARVESTER COMPANY, A CORPORATION OF NEW JERSEY.

LEVER.

1,427,684.        Specification of Letters Patent.    Patented Aug. 29, 1922.

Application filed August 13, 1917. Serial No. 185,940.

*To all whom it may concern:*

Be it known that I, ALBERT GRIEVES, a citizen of the United States, residing at Springfield, in the county of Clark and State of Ohio, have invented certain new and useful Improvements in Levers, of which the following is a full, clear, and exact specification.

This device relates to levers of general application, and more particularly to levers adapted for shifting gears in machines such as automobiles, mowing machines, combined rakes and tedders, and, in fact, all machines where slidable gears and clutch shifting levers are employed.

Where such slidable gears are to be shifted for the purpose of reversing the drive or for changing speed, great difficulty has been experienced in connection with the usual pawl or detent levers, since, when it is desired to shift these gears, unless the teeth of the two gears are properly positioned, the lever cannot be thrown to such a position that the pawl will engage the sector and thereby hold the lever in its adjusted position. In the careless operation of such shifting levers it has been found that when the conditions are as above pointed out, the lever is not thrown far enough to enable the pawl to enter the sector, and for this reason the gears will not be thrown into mesh and the machine will not operate. With these difficulties in mind, the present invention has been developed, and the object of the invention is to provide means whereby the speed of a machine may be changed or the gears may be reversed and the reversing mechanism will be positively held in any desired position whether or not the gears at the time they are shifted properly mesh.

The invention set forth in this application comprises, briefly, a lever composed of two sections, one of the sections carrying the means for shifting the gears and the other section carrying the pawl which cooperates with a fixed sector. These levers in this embodiment are mounted on a common pivot, and means are provided whereby, when the main operating lever is shifted and the pawl or detent carried thereby is adjusted to the desired notch in the sector, the remaining section of the lever will be longitudinally aligned with the main section as soon as the gears are in proper mesh; or, in other words, as soon as the teeth on one of the gears are opposite the spaces between the teeth on the other gear.

In this application one embodiment of the invention is illustrated in the drawings, and in these drawings—

Figure 1 shows a front elevational view of the improved lever and clutch shifting mechanism, the shifting mechanism being shown in connection with driving and driven gearing;

Figure 2 shows a side elevation, partly in section, of the lever, and clutch shifting mechanism shown in connection with the gearing shown in Figure 1;

Figure 3 is a detail front elevation of the lower portion of the lever and a clutch shifting sleeve, the gearing being shown diagrammatically; and Figure 4 is an enlarged sectional detail of the lower portion of the upper section of the lever illustrating the sector engaging tooth carried by the lower end of the section.

In the drawings I have shown a portion of the frame 10, which may represent any machine, and to this frame 10 is secured the sector 11, having the usual notches 12 for the reception of the sliding detent carried by the lever and stops 12' for limiting the swinging movement of the lever. This sector 11 is provided with a downwardly extending projection 13, to which are pivoted at 14 the two sections 15 and 16 which go to make up the lever. The lower section 15 carries a fork 17 of the usual construction for shifting gears, but it should be understood that this part is shown merely for the purpose of illustrating one practical embodiment of the use of this lever and that this section 15 is adapted for any other purposes for which a lever may be used. It will be noted from the sectional view in Figure 2 that the lower section 15 of the lever is mounted on pivot 14 on the inside adjacent the projection 13 on the sector 11, and that the upper section 16 is mounted outside and is held in place by the flanged head of the pivot 14. The upper section 16 carries at its upper end the usual detent operating bell crank lever 18, connected by means of a link 19 to a slidably mounted casing 20, which carries at its lower end a tooth 21 for engaging the notches 12 of the sector. This casing at its lower end also is provided with a loop 22 which encircles the section 16 and guides the casing in its longitudinal movement on the section. This section 16 has secured thereto a pin 23 which passes through the casing 20 and through a slot 24 in the front thereof, and is provided on its outer end with a head 25. A spring 26 is enclosed within the casing and acts at one end against the pin 23 and its other end against the lower wall of the casing to force the casing 20 downwardly, and the tooth 21 into one of the notches 12 of the sector 11.

The means for forcing the lower section 15 into longitudinal alignment with the upper section 16 will now be described. This means is embodied in two pivotally mounted dogs 27 and 28 which overlap in a manner similar to the blades of a pair of scissors or pliers and are mounted on a common pivot 29 carried by the lower end of the section 16 of the lever intermediate the pivot 15 of said lever and the upper notched surface of the sector 11. These pawls 27 and 28 have on their lower ends inwardly projecting stops 27' and 28' which are adapted to contact with the side edges of section 16, thereby limiting their inward movement, and on their upper ends inwardly projecting extensions 30 which project beyond the rear surface of the section 16 and into the path of the upper portion of the lower section 15 of the lever. These parts 30 are under constant pressure which tends to force them inward toward the body of the lever, this inward pressure being exerted by a single spring 31 which is mounted on suitable studs 32 carried by the lower ends of the dogs, and forces said lower ends outwardly, thereby forcing the upper ends 30 inwardly.

In Figures 2 and 3 I have shown for the purpose of illustrating one practical embodiment of my invention, the clutch shifting fork 17 as cooperating with a sleeve 33 slidably mounted on a shaft 34 and splined thereto. This sleeve carries at its opposite ends spur gears 35 and 36 which mesh, when properly adjusted, with spur gears 37 and 38, respectively.

From the illustration in Figures 2 and 3, it will be readily seen that if the teeth of the spur gear 35 are not so positioned with respect to the spur gear 37 that these teeth are opposite the spaces in said gear 37, and it is desired to throw these gears into mesh, if the usual clutch shifting lever were employed, the detent pawl of such lever could not be forced into the proper notch in the sector to hold these gears in engaging relation. However, with my improved two section lever, the upper section 16 may be thrown far enough for the detent 21 to mesh with the proper notch in the sector; as, for instance, the notch 39 shown in Figure 3, whether or not the gears 35 and 37 are so positioned as to be thrown immediately into mesh. When one of these gears has been so rotated that it will mesh with the other, the spring 31 carried by the dogs 27 and 28 will force the lower section 15 of the lever over into alignment with the upper section 16 and at the same time will force the clutch shifting fork 17 and the sleeve and gear 35 into mesh with the gear 37.

From the above description it will be seen that I have provided a simple and efficient means for insuring the positive adjustment of a clutch shifting lever whether or not the gears at the time the lever is shifted are in proper position to mesh with each other.

While I have in the above description set forth one embodiment of my invention, it will be understood that various modifications may be made without departing from the spirit of the invention as expressed in the following claims.

What I claim as new is:

1. In a lever, the combination of two sections having a common pivot, and means pivotally carried by one of the sections tending to longitudinally align the other section therewith.

2. In a lever, the combination of two sections having a common pivot, means for holding one section against movement in various positions of adjustment, and means pivotally carried by said section tending to longitudinally align the other section therewith.

3. In a lever, the combination of two cooperating sections, means carried by one section for shifting certain machine parts, means for holding the other section against movement in various positions of adjustment, and means including a plurality of pivoted members tending to longitudinally align the first section therewith.

4. In a lever, the combination of two sections, and means including pivoted dogs carried by one of the sections for longitudinally aligning the other section therewith.

5. In a lever, the combination of two sections having a common pivot, means for securing one of the sections in various positions of adjustment, a stud carried by one of said sections, pivoted dogs carried by said stud and having extensions located in the path of said other section, and resilient means for actuating said dogs.

6. In a lever, an arm comprising two relatively movable bars mounted on a common pivot and overlapped at one end, and yielding means engaging the edges of the overlapped ends and tending to keep the bars in parallel relation.

7. In a lever, an arm comprising two relatively movable bars mounted on a common pivot and overlapped at one end, and yielding means movably mounted on the end of one bar and engaging the edges of the overlapped ends and tending to keep the bars in parallel relation.

8. In a lever, an arm comprising two relatively movable overlapping sections mounted on a common pivot, means carried by one section on one side of said pivot for shifting said machine parts, means for holding the other section against movement in various positions of adjustment, and means located on the opposite side of said pivot from said shifting means and including a single spring tending to longitudinally align the two sections.

9. In a lever, the combination of two cooperating sections mounted on a common pivot, means carried by one section and located at one side of said pivot for shifting certain machine parts, means for holding the other section against movement in various positions of adjustment, and means including pivoted members carried by said last named section at the opposite side of said pivot from the said shifting means for longitudinally aligning the two sections.

10. In a lever, the combination of two sections, and means for moving one section upon movement of the other section, said means including two cooperating pivoted members, one of said members being forced into engagement with one section of said lever when the other section of said lever is moved.

11. In a lever, the combination of two sections, means for moving one section upon movement of the other section, said means including two cooperating members, and resilient means for communicating the movement of one of said members to the other member.

12. In a lever, the combination of two sections, a plurality of members carried by one of said sections and engaging the other of said sections, and single resilient means forcing said members into engagement with said last named section.

13. In a lever, the combination of two sections, and a plurality of yieldingly mounted members carried by one of said sections, each of said members having a part positioned for engaging each of said sections.

14. In a lever, the combination of two sections, a plurality of members pivotally mounted on one of said sections, each of said members having means for engaging each of said sections, and resilient means disposed between said members.

In testimony whereof I affix my signature.

ALBERT GRIEVES.